(12) United States Patent
Soppin et al.

(10) Patent No.: US 11,526,814 B2
(45) Date of Patent: Dec. 13, 2022

(54) SYSTEM AND METHOD FOR BUILDING ENSEMBLE MODELS USING COMPETITIVE REINFORCEMENT LEARNING

(71) Applicant: Wipro Limited, Bangalore (IN)

(72) Inventors: Shashidhar Soppin, Bangalore (IN); Chandrashekar Bangalore Nagaraj, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 454 days.

(21) Appl. No.: 16/830,323

(22) Filed: Mar. 26, 2020

(65) Prior Publication Data

US 2021/0248517 A1    Aug. 12, 2021

(30) Foreign Application Priority Data

Feb. 12, 2020 (IN) .............................. 202041006179

(51) Int. Cl.
*G06N 20/00* (2019.01)
*G06N 20/20* (2019.01)

(52) U.S. Cl.
CPC .................................. *G06N 20/20* (2019.01)

(58) Field of Classification Search
CPC .......... G06N 7/005; G06N 20/00; G06N 20/20
See application file for complete search history.

(56) References Cited

U.S. PATENT DOCUMENTS

| | | | | |
|---|---|---|---|---|
| 10,902,005 B2* | 1/2021 | Clinton | .............. | G06F 16/285 |
| 2016/0132787 A1 | 5/2016 | Drevo et al. | | |
| 2019/0102692 A1* | 4/2019 | Kwant | .............. | G06N 20/00 |
| 2019/0378010 A1* | 12/2019 | Morris | .............. | G06Q 20/4093 |
| 2020/0257992 A1* | 8/2020 | Achin | .............. | G06N 20/10 |

OTHER PUBLICATIONS

Wiering, K., et al., "Ensemble Algorithms in Reinforcement Learning", ResearchGate, IEEE Aug. 2008, 7 pages.

* cited by examiner

*Primary Examiner* — Pakee Fang
(74) *Attorney, Agent, or Firm* — Finnegan, Henderson, Farabow, Garrett & Dunner, LLP

(57) ABSTRACT

This disclosure relates to method and system for building ensemble models using competitive reinforcement learning (CRL). The method may include creating a plurality of clusters, each including a set of predictive models forming the ensemble model. For each of the plurality of clusters, the method may further include initializing each of the set of predictive models with random values for a set of first parameters to obtain a first accuracy score, categorizing each of the set of predictive models into a first associated category based on a first accuracy score, calculating a first reward for each of the set of predictive models based on the first associated category, and determining a set of second parameters for each of the set of predictive models using CRL to obtain a second accuracy score.

15 Claims, 8 Drawing Sheets

| Name 501 | Description 502 |
|---|---|
| Timestamp (Ts) 512 | It is the duration of time in minutes that the method uses, as the decision time stamp. At each time stamp, the method takes decision for the next step. It is set to 0. |
| Reward (r) 510 | This corresponds to the reward similar to the one in deep reinforcement learning. It is a numerical value and initialized to 0. |
| Competitive Threshold (Ct) 505 | This is the threshold used to remove the model from the ensemble of the cluster. It is initialized to 0. |
| State (s) 513 | This is a list, which will have snapshot of the cluster information, status of models (value of hyper-parameters), reward (r), and competitiveness parameter. The state stores this for all the clusters. It will store them with their initialized values at the beginning. |
| Total Time (Tt) 514 | This is time to end the execution of the system. |
| Total number of epochs (Te) 504 | This is the total number of epochs after which the system has to stop the execution. |
| Hyper Parameters (€, λ, η) 503 | These are the hyper-parameters of the DL models in the cluster, which will be tuned based on the decision made at each time stamp. |
| Percentile Rank 511 | At each decision step, the DL models are judged based on their performance scores and assigned or provided percentile rank based on percentile over the available DL models. It is applicable to the clusters. |

FIG. 5A

| Parameters 501 | Description 502 |
|---|---|
| Threshold Rank 506 (threshRank) | This is minimum threshold rank (averaged over decision steps) that any of the DL model is expected to achieve to be part of the ensemble. Same is applicable to the ensemble of clusters. |
| Threshold performance score 507 for the strong, average and weak learners (strongPerfThreshholdScore, averagePerfThreshholdScore, weakPerfThreshholdScore) | These scores are used to decide if the model is strong learner, average learner, or weak learner based on its performance. Same set of parameters will be stored for the clusters. |
| Rank Threshold Time 508 (modelRankThresholdTime, clusterRankThresholdtime) | This is the time (a finite number of decision steps), which is used to judge if the model or cluster can be judged as non-competitive. |
| Weak threshold rank 509 (weakThreshholdRank) | This score is used to decide if the model can be removed from the ensemble based on its performance. If a model average competitiveness score or rank is below this threshold successfully for modelRankThresholdTime time steps, then it is removed from the ensemble. |

FIG. 5B

SYSTEM AND METHOD FOR BUILDING ENSEMBLE MODELS USING COMPETITIVE REINFORCEMENT LEARNING

TECHNICAL FIELD

This disclosure relates generally to ensemble models, and more particularly to method and system for building ensemble models using competitive reinforcement learning.

BACKGROUND

In today's world, an increasing number of applications are utilizing Artificial Intelligence (AI) to extract useful information and to make predictions. Typically, AI includes various machine learning (ML) models and/or deep learning (DL) models. Thus, for any given application, one of the most challenging tasks is to build an ensemble model comprising most suitable ML/DL models.

Conventionally, determining optimized or right set of hyper-parameters for any ML/DL model is challenging and time-consuming. Each combination of real and near possible hyper-parameters is processed and the ML/DL model is re-run from the beginning in each epoch (learning cycle). This process is inefficient, time consuming, and computationally intensive, particularly for a large dataset. For example, a large dataset such as image-net, Microsoft Coco Data Set (MS-COCO), Visual Question and Answer System (visualQA), CIFAR-10, or the like will consume more time and computational power to re-run the entire data set. As will be appreciated, for any ML/DL model and for any dataset, performing a prediction along with tuning of hyper-parameters as two parallel processes may be unfeasible. This may lead to inaccurate prediction results with multiple iterations of executions.

Further, in existing techniques, all the models in an ensemble model are typically developed independent of each other and, then, combined optimally during deployment. This results in wastage of computational resources, redundancies, and conflict in decision-making. For example, each model can learn certain features in a better way and no single model can learn all the good features. Further, for example, each model is accurate for different types of field data and for the given training data. Thus, apart from wastage of computational resources, there is confusion and deployment errors. Further, in some of the existing techniques, there is no learning of features after the ensemble model are developed. Further, existing techniques do not disclose competitive learning that enables the ensemble model to learn many relevant features. Moreover, existing techniques perform multiple iterations resulting in wastage of computational resources, over training, and inaccuracies.

In short, existing techniques fall short in providing a mechanism for learning all the features for the ensemble model. Further, existing techniques fail to provide a mechanism for improving performance of ensemble model using competitive reinforcement learning.

SUMMARY

In one embodiment, a method for building an ensemble model is disclosed. In one example, the method may include creating a plurality of clusters, each including a set of predictive models forming the ensemble model. The method may further include initializing, for each of the plurality of clusters, each of the set of predictive models with random values for a set of first parameters to obtain a first accuracy score. The method may further include categorizing, for each of the plurality of clusters, each of the set of predictive models into a first associated category based on the first accuracy score. The first associated category includes one of a strong learner category, an average learner category, and a weak learner category. The method may further include calculating, for each of the plurality of clusters, a first reward for each of the set of predictive models based on the first associated category. The first reward is highest for the strong learner category and lowest for the weak learner category. The method may further include determining, for each of the plurality of clusters, a set of second parameters for each of the set of predictive models using competitive reinforcement learning (CRL) to obtain a second accuracy score.

In one embodiment, a system for building an ensemble model is disclosed. In one example, the system may include a processor and a computer-readable medium communicatively coupled to the processor. The computer-readable medium may store processor-executable instructions, which, on execution, may cause the processor to create a plurality of clusters, each including a set of predictive models forming the ensemble model. The processor-executable instructions, on execution, may further cause the processor to initialize, for each of the plurality of clusters, each of the set of predictive models with random values for a set of first parameters to obtain a first accuracy score. The processor-executable instructions, on execution, may further cause the processor to categorize, for each of the plurality of clusters, each of the set of predictive models into a first associated category based on the first accuracy score. The first associated category includes one of a strong learner category, an average learner category, and a weak learner category. The processor-executable instructions, on execution, may further cause the processor to calculate, for each of the plurality of clusters, a first reward for each of the set of predictive models based on the first associated category. The first reward is highest for the strong learner category and lowest for the weak learner category. The processor-executable instructions, on execution, may further cause the processor to determine, for each of the plurality of clusters, a set of second parameters for each of the set of predictive models using CRL to obtain a second accuracy score.

In one embodiment, a non-transitory computer-readable medium storing computer-executable instructions for building an ensemble model is disclosed. In one example, the stored instructions, when executed by a processor, may cause the processor to perform operations including creating a plurality of clusters, each including a set of predictive models forming the ensemble model. The operations may further include initializing, for each of the plurality of clusters, each of the set of predictive models with random values for a set of first parameters to obtain a first accuracy score. The operations may further include categorizing, for each of the plurality of clusters, each of the set of predictive models into a first associated category based on the first accuracy score. The first associated category includes one of a strong learner category, an average learner category, and a weak learner category. The operations may further include calculating, for each of the plurality of clusters, a first reward for each of the set of predictive models based on the first associated category. The first reward is highest for the strong learner category and lowest for the weak learner category. The operations may further include determining, for each of the plurality of clusters, a set of second parameters for each of the set of predictive models using CRL to obtain a second accuracy score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A and 5B illustrate an exemplary table describing the set of parameters for the set of predictive models, a set of threshold parameters, and rank and competitiveness score parameters, along with initialization values, in accordance with some embodiments of the present disclosure.

DETAILED DESCRIPTION

Exemplary embodiments are described with reference to the accompanying drawings, Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
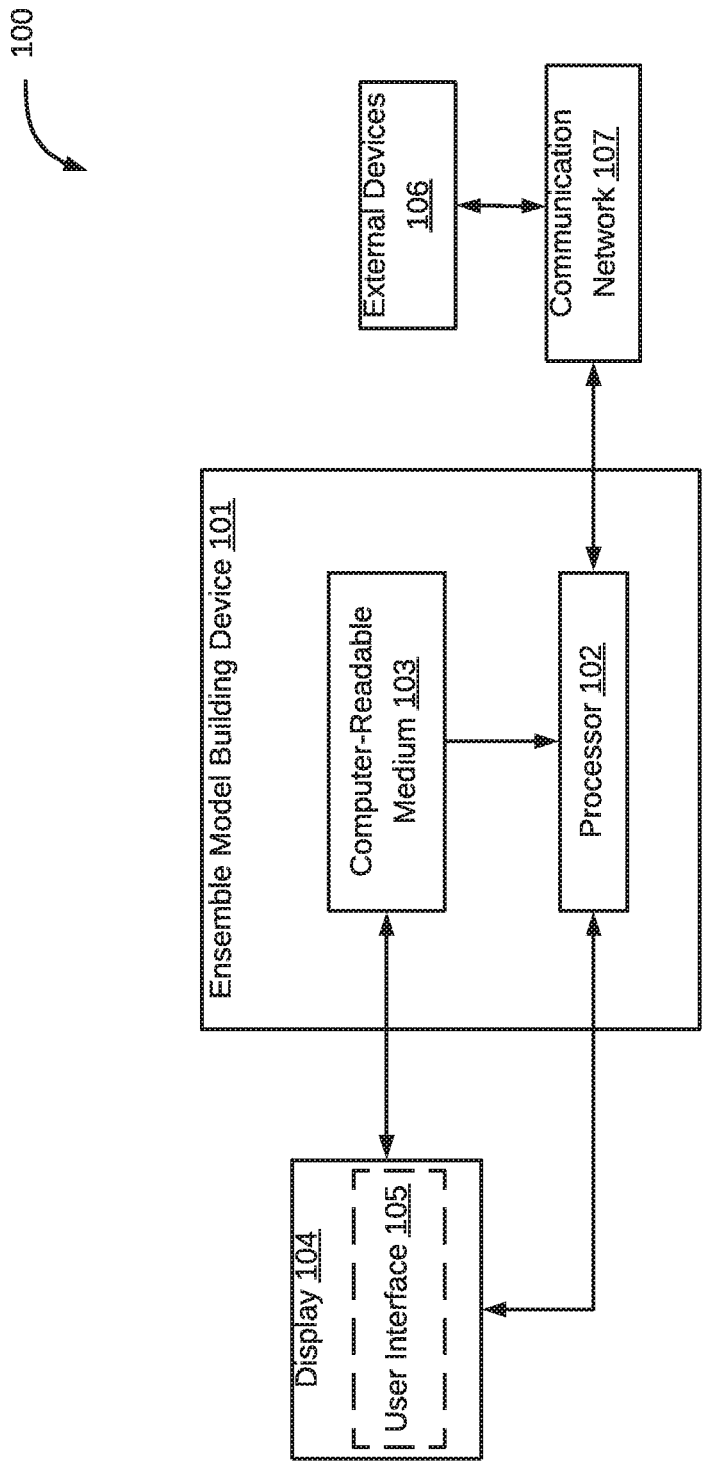
FIG. 1 is a block diagram of an exemplary system for building an ensemble model, in accordance with some embodiments of the present disclosure.

Referring now to FIG. 1, an exemplary system 100 for building an ensemble model is illustrated, in accordance with some embodiments of the present disclosure. The system 100 may implement in an ensemble model building engine, in accordance with some embodiments of the present disclosure. The ensemble model building engine may build the ensemble model using competitive reinforcement learning (CRL). In particular, the system 100 may include an ensemble model building device 101 (for example, server, desktop, laptop, notebook, netbook, tablet, smartphone, mobile phone, or any other computing device) that may implement the ensemble model building engine. It should be noted that, in some embodiments, the ensemble model building engine may determine a set of parameters for each of the set of predictive models using CRL to build and to improve the performance of the ensemble model.

As will be described in greater detail in conjunction with FIGS. 2-4, the ensemble model building device may create a plurality of clusters, each including a set of predictive models forming the ensemble model. The ensemble model building device may further initialize, for each of the plurality of clusters, each of the set of predictive models with random values for a set of first parameters to obtain a first accuracy score. The ensemble model building device may further categorize, for each of the plurality of clusters, each of the set of predictive models into a first associated category based on a first accuracy score. It may be noted that the first associated category includes one of a strong learner category, an average learner category, and a weak learner category. The ensemble model building device may further calculate, for each of the plurality of clusters, a first reward for each of the set of predictive models based on the first associated category. It may be noted that the first reward is highest for the strong learner category and lowest for the weak learner category. The ensemble model building device may further determine, for each of the plurality of clusters, a set of second parameters for each of the set of predictive models using CRL to obtain a second accuracy score.

In some embodiments, the ensemble model building device 101 may include one or more processors 102 and a computer-readable medium 103 (for example, a memory). The computer-readable medium 103 may include the ensemble model (a set of predictive models forming the ensemble model) which may generate an output (e.g. a prediction) for an input data (e.g. image, text, etc.), Further, the computer-readable storage medium 103 may store instructions that, when executed by the one or more processors 102, cause the one or more processors 102 to build the ensemble model and determine parameters for each of a set of predictive models forming the ensemble, in accordance with aspects of the present disclosure. The computer-readable storage medium 103 may also store various data (for example, a name, a rank, and a competitiveness score of each of the set of predictive models and each of a plurality of clusters, the set of predictive models of the ensemble, a set of parameters for each of the set of predictive models for each epoch of the ensemble, and the like) that may be captured, processed, and/or required by the system 100.

The system 100 may further include a display 104. The system 100 may interact with a user via a user interface 105 accessible via the display 104. The system 100 may also include one or more external devices 106. In some embodiments, the ensemble model building device 101 may interact with the one or more external devices 106 over a communication network 107 for sending or receiving various data. The external devices 106 may include, but may not be limited to, a remote server, a digital device, or another computing system.

Figure 2:
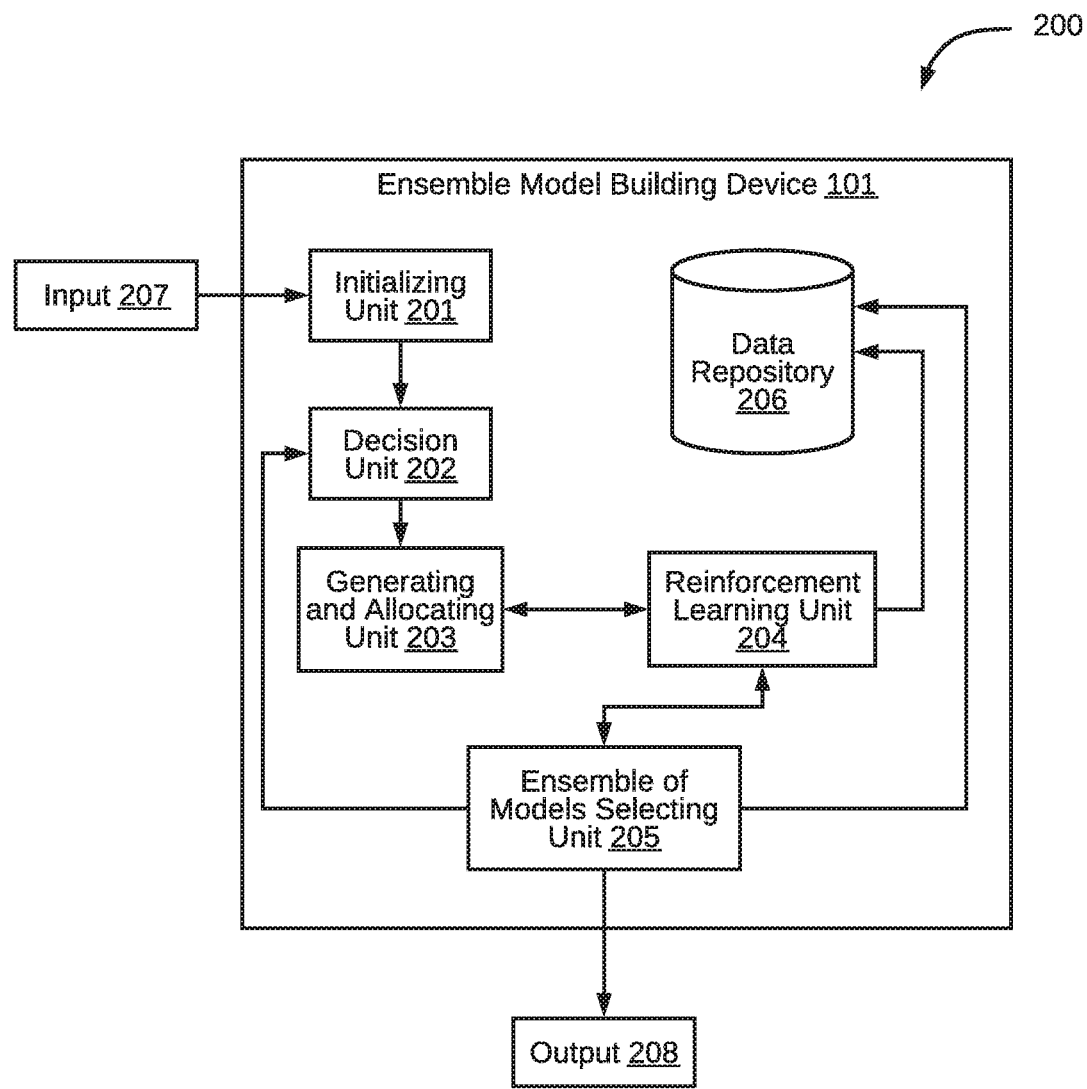
FIG. 2 is a functional block diagram of an ensemble model building device implemented by the exemplary system of FIG. 1, in accordance with some embodiments of the present disclosure.

Referring now to FIG. 2, a functional block diagram of an ensemble model building device 200 (analogous to the ensemble model building device 101 implemented by the system 100) is illustrated, in accordance with some embodiments of the present disclosure. The ensemble model building device 200 may include an initializing unit 201, a decision unit 202, a generating and allocating unit 203, a reinforcement learning unit 204, an ensemble of models selecting unit 205, and a data repository 206. The initialization unit 201 may receive a set of predictive models forming the ensemble model, as an input 207 over a user interface (UI). In some embodiments, the input 207 may include identical predictive models, each trained using a unique dataset, performing an identical function (for example, classification). In some other embodiments, the input 207 may include a set of similar predictive models performing an identical function (for example, classification) and trained using a common dataset. For example, the set of predictive models in the input 207 may include a Gradient Boosting Machine (GBM) model, an XGBoost model, Adaboost model, and the like.

Further, the initialization unit 201 may select the set of predictive models to form the ensemble model, a count of the plurality of clusters, and a set of first parameters for training each of the set of predictive models and the ensemble model. In some embodiments, the initialization unit 201 may assign a model identity (ID) to each of the set of predictive models. By way of an example, the model ID for each of the set of predictive models may be $DL_1$, $DL_2, \ldots, DL_n$, where n is a count of the set of predictive models. In an exemplary scenario, the count of the plurality of clusters may be between 5 to 10.

Further, in some embodiments, each of the plurality of clusters may include the set of predictive models forming the ensemble. However, in such embodiments, the initialization unit 201 may initialize each of the set of predictive models in each of the plurality of clusters with random values for a set of first parameters. It may be noted that, the set of first parameters may be a set of parameters used for training the set of predictive models for a first epoch and may be updated using heuristics in order to obtain maximum accuracy from training. For example, the set of first parameters may include a batch size, a learning rate, a momentum, a number of epochs, one or more performance thresholds, or the like. As will be appreciated, the batch size may be a count of the set of predictive models provided to the ensemble model building device 101 as the input 207, the learning rate may be a rate of updating the set of parameters of each of the set of predictive models, the momentum may imply a direction of a next step using information of previous steps, the number of epochs may be a count of a plurality of training cycles, and the one or more performance thresholds may include a target accuracy score for the ensemble model, and a threshold of accuracy to be verified for each of the plurality of training cycles. In some embodiments, the one or more performance thresholds may be a strong performance threshold score, an average learner threshold score, and a weak learner threshold score. Further, the initialization unit 201 may assign a cluster ID to each of the plurality of clusters. By way of an example, the cluster ID for each of the plurality of clusters may be $CL_1$, $CL_2, \ldots, CL_k$, where k is the count of the plurality of clusters.

Further, the initialization unit 201 may send the set of predictive models initialized with the set of first parameters to the decision unit 202 to initiate training process. In some embodiments, the initialization unit 201 may be configured to send the model ID for each of the set of predictive models, the cluster ID for each of the plurality of clusters, and the set of first parameters to the data repository 206. The decision unit 202 may receive the set of predictive models initialized with the set of first parameters from the initialization unit 201. Further, the decision unit 202 may initiate a first of the plurality of training cycles for each of the plurality of clusters to obtain a first accuracy score. In some embodiments, the set of predictive models in each of the plurality of clusters may be trained in a training cycle using parallel processing. Further, the decision unit 202 may initialize performance metrics of each of the set of predictive models in each of the plurality of clusters to zero values and store the performance metrics in the data repository 206. It may be noted that the performance metrics may include an accuracy score of the predictive model. Further, the decision unit 202 may categorize each of the set of predictive models in each of the plurality of clusters into a first associated category and based on the first accuracy score. In some embodiments, the first associated category may be one of a strong learner category, an average learner category, and a weak learner category. It may be noted that in such embodiments, prior to the first of the plurality of training cycles, the decision unit 202 may categorize each of the set of predictive models in each of the plurality of clusters into each of the strong learner category, the average learner category, and the weak learner category.

Further, the generating and allocating unit 203 may receive the first associated category of each of the set of predictive models in each of the plurality of clusters from the decision unit 202. Further, the generating and allocating unit 203 may train each of the set of predictive models in each of the plurality of clusters using the set of first parameters. In some embodiments, the generating and allocating unit 203 may assign a rank and a competitiveness score to each of the set of predictive models in each of the plurality of clusters and to each of the plurality of clusters based on an accuracy score calculated upon completing a predefined count of the plurality of training cycles or a predefined threshold time. In some other embodiments, the generating and allocating unit 203 may assign the rank and the competitiveness score to each of the set of predictive models in each of the plurality of clusters and to each of the plurality of clusters based on the first accuracy score. In an exemplary scenario, the competitiveness score may be one of 1, 2, or 3 corresponding to each of the set of predictive models in each of the plurality of clusters belonging to the weak learner category, the average learner category, and the strong learner category, respectively. In some embodiments, the generating and allocating unit 203 may determine the first associated category based on the rank and the competitiveness score of each of the set of predictive models in each of the plurality of clusters.

Further, the reinforcement learning unit 204 may receive the set of predictive models, the plurality of clusters, and the rank and the competitiveness score of each of the set of predictive models in each of the plurality of clusters and each of the plurality of clusters from the generating and allocating unit 203, The reinforcement learning unit 204 may calculate a first reward for each of the set of predictive models in each of the plurality of clusters and each of the plurality of clusters based on the first associated category. In some embodiments, the first reward may be highest for the strong learner category and lowest for the weak learner category. In some embodiments, the first reward may be back propagated through the set of predictive models, during training, in order to increase competitiveness of the set of predictive models. By way of an example, the first reward may be determined by a Q-Learning algorithm. Further, the reinforcement learning unit 204 may determine a set of second parameters for each of the set of predictive models in each of the plurality of clusters and each of the plurality of clusters using CRL to obtain a second accuracy score. Similar to the set of first parameters, the second parameters may be the batch size, the learning rate, the momentum, the number of epochs, and one or more performance thresholds. In some embodiments, the reinforcement learning unit 204 may determine the set of second parameters for a predictive model belonging to the weak category based on the set of first parameters of an identical predictive model belonging to the average category.

Further, in some embodiments, the reinforcement learning unit 204 may determine the set of second parameters for a predictive model belonging to the average category based on the set of first parameters of an identical predictive model belonging to the strong category. Also, it may be noted that the set of second parameters for each of the set of predictive models may be determined based on the set of first parameters of another of the set of predictive models. Further, the reinforcement learning unit 204 may determine a second associated category for each of the set of predictive models based on the second accuracy score. Similar to the first associated category, the second associated category may be one of a strong learner category, an average learner category, and a weak learner category. Additionally, the reinforcement learning unit 204 may calculate a second reward for each of the set of predictive models based on the second associated category. Similar to the first reward, the second reward may be highest for the strong learner category and lowest for the weak learner category. By way of an example, the second reward may be determined by a Q-Learning algorithm. Further, the second reward may be back-propagated through the set of predictive models, during training, in order to increase competitiveness of the set of predictive models. It may be noted that the reinforcement learning unit 204 may iterate each of the above mentioned steps for each of the plurality of training cycles following the first of the plurality of training cycles.

Further, the reinforcement learning unit 204 may send learning information for each of the set of predictive models in each of the plurality of clusters to the ensemble of models selecting unit 205 for each of the plurality of training cycles. It may be noted that the learning information may include an accuracy score, an associated category, the rank, the competitiveness score, and updated weights. Further, the reinforcement learning unit 204 may send the set of second parameters to the data repository 206. Further, the reinforcement learning unit 204 may send the rank and the competitiveness score of each of the set of predictive models in each of the plurality of clusters and each of the plurality of clusters to the generating and allocating unit 203.

The ensemble of models selecting unit 205 may receive the learning information from the reinforcement learning unit 204. In some embodiments, the ensemble of models selecting unit 205 may evaluate the one or more performance metrics for each of the set of predictive models in each of the plurality of clusters and each of the plurality of clusters, based on the second accuracy of each of the set of predictive models in each of the plurality of clusters and each of the plurality of clusters belonging to the strong learner category. Further, the ensemble of models selecting unit 205 may select a predictive model belonging to the strong learner category, with highest accuracy score during training over the plurality of training cycles. In some exemplary scenarios, the ensemble of models selecting unit 205 may send the learning information to the decision unit 202 when the one or more performance thresholds are not achieved, or the predefined number of epochs are not completed. In some other scenarios, the ensemble of models selecting unit 205 may send the learning information as the output 208 when the one or more performance thresholds are achieved, and the predefined number of epochs are completed.

In some embodiments, the decision unit 202 may remove a predictive model when the associated category of the predictive model is the weak learner category for a predefined threshold time, or a predefined number of epochs. On the contrary, the decision unit 202 may retain a predictive model in the ensemble model when the associated category of the predictive model is the weak learner category for less than the predefined threshold time, or the predefined number of epochs. In some embodiments, the decision unit 202 may retain a predictive model in the ensemble model when the associated category of the predictive model is one of the strong learner category or the average learner category. The decision unit 202 may update the associated category of a predictive model belonging to the weak learner category to the average learner category if the performance metrics of the predictive model are greater than the performance metrics of a predictive model belonging to the average learner category for a predefined threshold time, or a predefined number of epochs.

The decision unit 202 may update the associated category of a predictive model belonging to the average learner category to the strong learner category if the performance metrics of the predictive model are greater than the performance metrics of a predictive model belonging to the strong learner category for a predefined threshold time, or a predefined number of epochs. Further, the decision unit 202 may determine the second associated category for each of the set of predictive models based on the learning information received from the ensemble of models selecting unit 205 upon completion of a second of the plurality of training cycles.

Further, the decision unit 202 may send the second associated category to the generating and allocating unit 203. It may be noted that the decision unit 202 may update an associated category of each of the set of predictive models based on the learning information received from the ensemble of models selecting unit 205 upon completion of each of the plurality of training cycles and send the associated category of each of the set of predictive models to the generating and allocating unit 203. In some embodiments, the data repository 206 may receive and store the performance metrics, the set of first parameters, the set of second parameters and the set of parameters for each of the subsequent epochs, the model ID for each of the set of predictive models, and the cluster ID for each of the plurality of clusters.

It should be noted that all such aforementioned modules 201-206 may be represented as a single module or a combination of different modules. Further, as will be appreciated by those skilled in the art, each of the modules 201-206 may reside, in whole or in parts, on one device or multiple devices in communication with each other. In some embodiments, each of the modules 201-206 may be implemented as dedicated hardware circuit comprising custom application-specific integrated circuit (ASIC) or gate arrays, off-the-shelf semiconductors such as logic chips, transistors, or other discrete components. Each of the modules 201-206 may also be implemented in a programmable hardware device such as a field programmable gate array (FPGA), programmable array logic, programmable logic device, and so forth. Alternatively, each of the modules 201-206 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for building the ensemble model. For example, the exemplary system 100 and the associated ensemble model building device 101, 200 may build the ensemble model by the processes discussed herein.

In particular, as will be appreciated by those of ordinary skill in the art, control logic and/or automated routines for performing the techniques and steps described herein may be implemented by the system 100 and the associated ensemble model building device 101, 200 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3A:
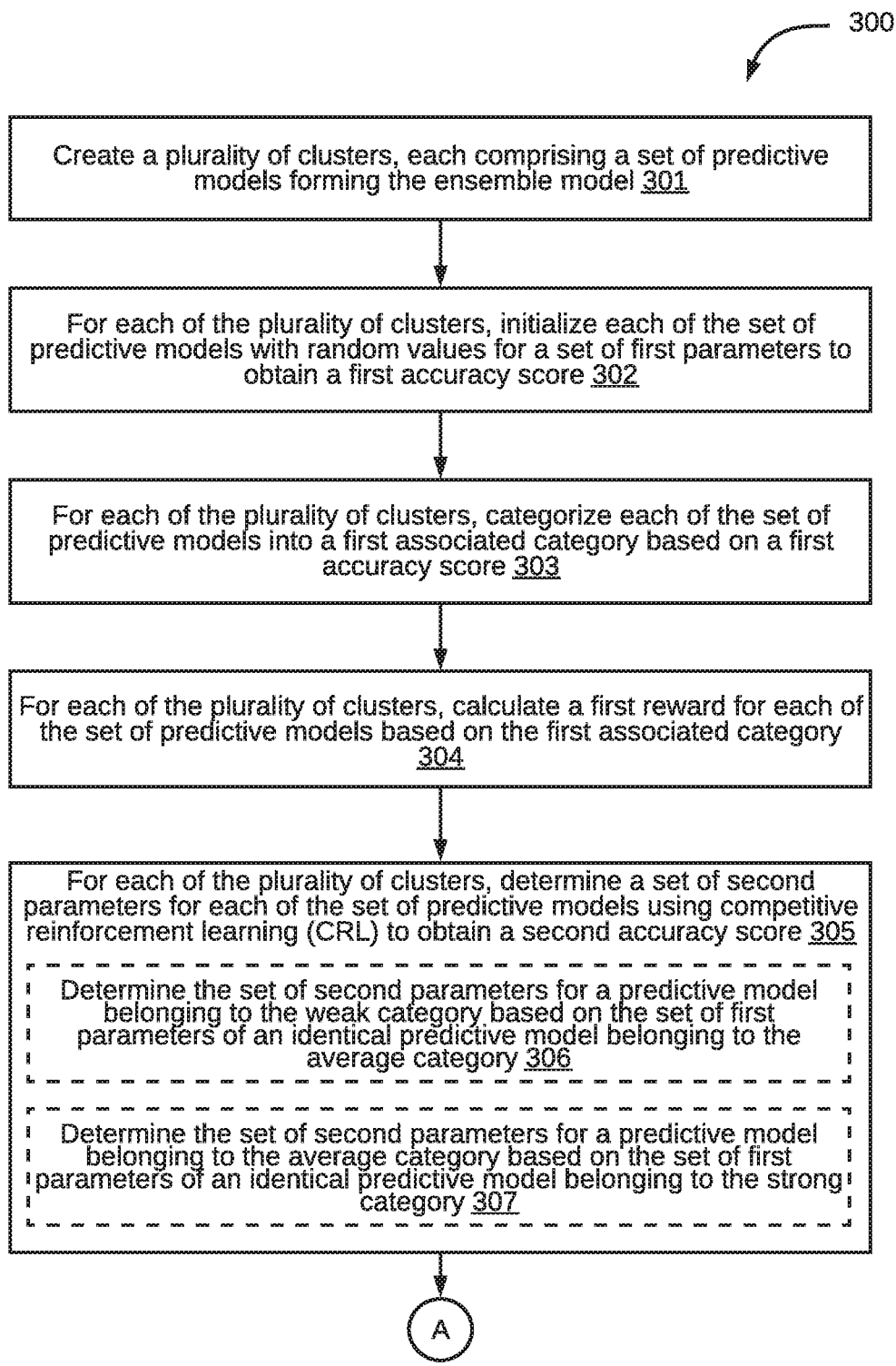
FIGS. 3A and 3B illustrate a flow diagram of an exemplary process for building an ensemble model, in accordance with some embodiments of the present disclosure.
Figure 3B:
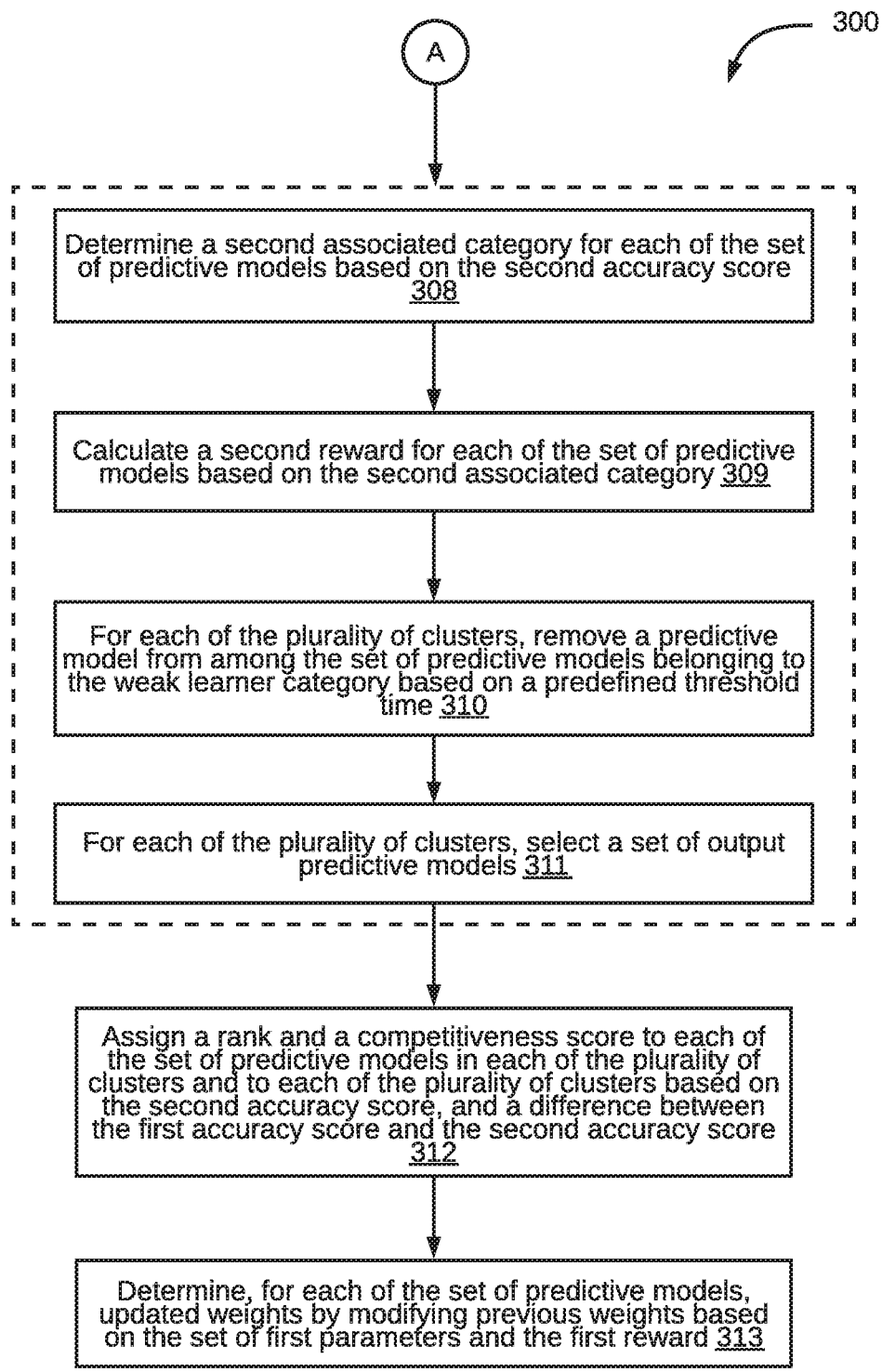

Referring now to FIGS. 3A and 3B, an exemplary process 300 for building an ensemble model is depicted via a flowchart, in accordance with some embodiments of the present disclosure. The process 300 may include creating a plurality of clusters, each comprising a set of predictive models forming the ensemble model, at step 301. Further, at step 302, for each of the plurality of clusters, each of the set of predictive models may be initialized with random values for a set of first parameters to obtain a first accuracy score. Further, the process 300 may include, for each of the plurality of clusters, categorizing each of the set of predictive models into a first associated category based on the first accuracy score, at step 303. It may be noted that the first associated category may include one of a strong learner category, an average learner category, and a weak learner category. Further, at step 304, for each of the plurality of clusters, a first reward for each of the set of predictive models may be calculated based on the first associated category. It may be noted that the first reward is highest for the strong learner category and lowest for the weak learner category.

Further, the process 300 may include, for each of the plurality of clusters, determining a set of second parameters may be for each of the set of predictive models using CRL to obtain a second accuracy score at step 305. Further, at step 306, the set of second parameters may be determined for a predictive model belonging to the weak category based on the set of first parameters of an identical predictive model belonging to the average category. Further, step 307 of the process 300 may include determining the set of second parameters for a predictive model belonging to the average category based on the set of first parameters of an identical predictive model belonging to the strong category. Further, at step 308, a second associated category may be determined for each of the set of predictive models based on the second accuracy score. It may be noted that the second associated category may include one of a strong learner category, an average learner category, and a weak learner category.

Further, at step 309, a second reward may be calculated for each of the set of predictive models based on the second associated category. It may be noted that the second reward is highest for the strong learner category and lowest for the weak learner category. Further, at step 310, for each of the plurality of clusters, a predictive model may be removed from among the set of predictive models belonging to the weak learner category based on a predefined threshold time. Further, at step 311, for each of the plurality of clusters, a set of output predictive models. It may be noted that the set of output predictive models may include each of the set of predictive models belonging to the strong learner category based on a predefined threshold time. Additionally, at step 312, a rank and a competitiveness score may be assigned to each of the set of predictive models in each of the plurality of clusters and to each of the plurality of clusters based on the second accuracy score, and a difference between the first accuracy score and the second accuracy score. Further, at step 313, updated weights may be determined, for each of the set of predictive models, by modifying previous weights based on the set of first parameters and the first reward.

It may be noted that the steps 301-304 of the process 300, may be executed by the ensemble model building device 101, 200 during the first of the plurality of training cycles of the process 300. In some embodiments, the first of the plurality of training cycles may be completed by the step 305. It may be noted that the step 305 marks an ending of the first of the plurality of training cycles and a beginning of the second of the plurality of training cycles. Further, in the process 300, the steps 305-313 may be iterated over the plurality of training cycles starting from the second of the plurality of training cycles.

Figure 4:
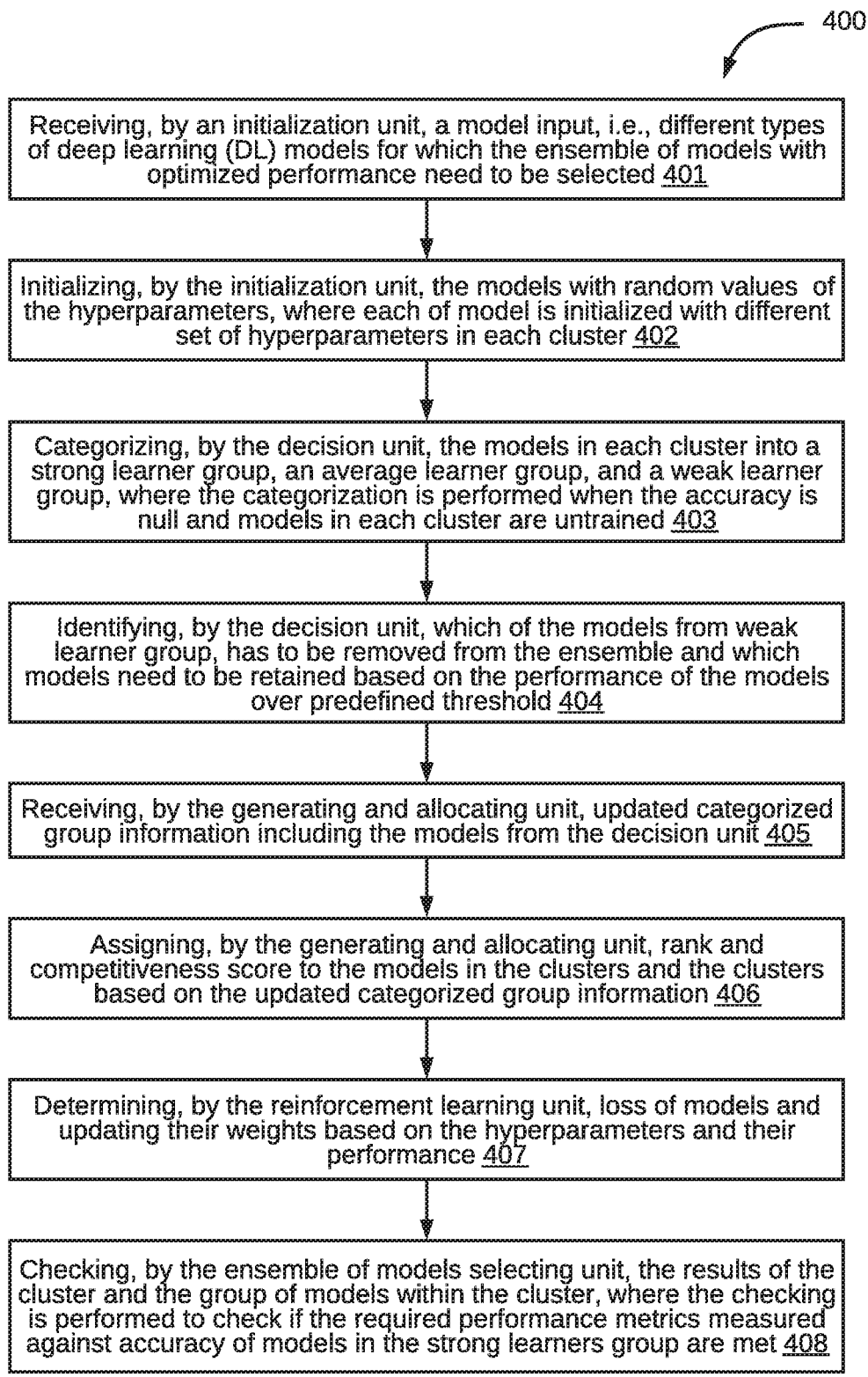
FIG. 4 is a flow diagram of a detailed exemplary process for building an ensemble model, in accordance with some embodiments of the present disclosure.

Referring now to FIG. 4, a detailed exemplary process 400 for building an ensemble model is depicted via a flowchart, in accordance with some embodiments of the present disclosure, At step 401 of the process 400, the initialization unit 201 may receive an input 207. As explained in conjunction with FIG. 2, the input 207 may include the set of predictive models forming the ensemble model. In some embodiments, the input 207 may include identical predictive models, each trained using a unique dataset, performing an identical function (for example, classification). In some other embodiments, the input 207 may include a set of similar predictive models performing an identical function (for example, classification) and trained using a common dataset.

Further, at step 402, the initialization unit 201 may initialize each of the set of predictive models in each of the plurality of clusters with random values for a set of parameters. In some embodiments, the initialization unit 201 may initialize each of the set of predictive models in each of the plurality of clusters with a unique set of first parameters. The initialization unit 201 may initialize a model ID for each of the set of predictive models in each of the plurality of clusters and a cluster ID for each of the plurality of clusters. By way of an example, the model ID for the set of predictive models may be CNN1, CNN2, CNN3, and so on. Further, the initialization unit 201 may create the plurality of clusters, each comprising the set of predictive models forming the ensemble model. In some scenarios, the count of the plurality of clusters may be predefined. In some embodiments, the count of the set of predictive models forming an ensemble model may be "n". In such embodiments, the count of the plurality of clusters may be one of "n", "n/2", or determined using any other method by the initialization unit 201. In some preferred embodiments, the count of the plurality of clusters determined using a hypothetical method by the initialization unit 201 may be greater than "n/2". As will be appreciated, a total time for completing the plurality of training cycles may be higher for a larger count of the plurality of clusters. Further, the initialization unit 201 may initialize the set of first parameters with random values. In some embodiments, the random values may be from within a predefined range of values for each of the set of first parameters.

At step 403, the decision unit 202 may categorize each of the set of predictive models in each of the plurality of clusters into one of the strong learner category, the average learner category; or the weak learner category. It may be noted that prior to the first of the plurality of training cycles, each of the set of predictive models in each of the plurality of clusters may be untrained. Also, it may be noted that prior to the first of the plurality of training cycles, the accuracy score for each of the set of predictive models in each of the plurality of clusters may be zero. Further, the decision unit 202 may receive the set of predictive models in each of the plurality of clusters and the set of first parameters from the initialization unit 201. Further, the decision unit 202 may categorize each of the set of predictive models in each of the plurality of clusters into one of the strong learner category, the average learner category, or the weak learner category based on the rank; the competitiveness score, or the performance metrics received from the generating and allocating unit 203. In some embodiments, the decision unit 202 may categorize a predictive model in the strong learner category when the rank, the competitiveness score, or the performance metrics of the predictive model may be greater than or equal to a strong performance threshold score. Similarly; the decision unit 202 may categorize the predictive model in the average learner category and the weak learner category based on an average learner threshold score and a weak learner threshold score, respectively.

At step 404, the decision unit 202 may remove the predictive model belonging to the weak learner category from the ensemble model based on the rank, the competitiveness score, or the performance metrics of the predictive model over a weak learner threshold time. Further, the decision unit may retain the predictive model belonging to the weak learner category in the ensemble model based on the rank, the competitiveness score, or the performance metrics of the predictive model over a predefined threshold time. In some embodiments, the decision unit 202 may receive the learning information from the ensemble of models selecting unit 205. In such embodiments, the decision unit 202 may remove the predictive model belonging to the weak learner category from the ensemble model when the rank, the competitiveness score, or the performance metrics of the predictive model may be below the weak learner threshold score over the weak learner threshold time.

In some embodiments, the reinforcement learning unit 204 may determine the set of second parameters of the predictive model belonging to the average learner category based on the set of first parameters of the predictive model belonging to the strong learner category. Similarly, the set of second parameters of the predictive model belonging to the weak learner category may be calculated based on the set of first parameters of the predictive model belonging to the average learner category. As will be appreciated, CRL may make each of the set of predictive models competitive by rewarding a well-performing predictive model and penalizing a poor-performing predictive model. It may be noted that the predictive model belonging to the weak learner category may compete with the predictive model belonging to the average learner category rather than the predictive model belonging to the strong learner category for efficient learning.

Further, at step 405, the generating and allocating unit 203 may receive the second associated category for each of the set of predictive models in each of the plurality of clusters from the decision unit 202. Further, at step 406, the generating and allocating unit 203, may assign the rank and the competitiveness score to each of the set of predictive models in each of the plurality of clusters and the clusters based on the second associated category.

In some embodiments, the generating and allocating unit 203 may train each of the set of predictive models in each of the plurality of clusters based on the set of parameters for each of the plurality of training cycles. For example, during first of the plurality of training cycles, each of the set of predictive models in each of the plurality of clusters may be trained based on the set of first parameters. In some embodiments, the generating and allocating unit 203 may assign the rank to each of the set of predictive models in each of the plurality of clusters based on the accuracy score achieved upon completing each of the plurality of training cycles. In some other embodiments, the generating and allocating unit 203 may assign the rank to each of the set of predictive models in each of the plurality of clusters based on the accuracy score achieved upon completing a predefined threshold number of the plurality of training cycles or a predefined threshold time. It may be noted that the rank may be assigned based on a percentile of accuracy of each of the set of predictive models in each of the plurality of clusters. Further, the generating and allocating unit 203 may assign the competitiveness score to each of the set of predictive models in each of the plurality of clusters based on the associated category upon completion of each of the plurality of training cycles. For example, the competitiveness score corresponding to the predictive model belonging to the weak learner category, the average learner category, and the strong learner category may be 1, 2, and 3, respectively. Further, the predictive model may be categorized into the second associated category based on the rank and the competitiveness score.

Further, the generating and allocating unit 203 may assign the reward to each of the set of predictive models in each of the plurality of clusters based on the competitiveness score. By way of an example, there may be three predictive models in an ensemble model—$DL_1$, $DL_2$, and $DL_3$, and there may be three clusters $C_1$, $C_2$, and $C_3$. In such scenarios, initially, each of the three predictive models in each of the three clusters may be initialized with a set of first parameters. Further, at each of a plurality of decision steps ($T_s$), the performance metrics, the accuracy score, or error may be determined for each of the three predictive models in each of the three clusters. For example, the accuracy score of each of the three predictive models in $C_1$ may be in the order: $DL_1 > DL_3 > DL_2$. It may be noted that $DL_1$ may be categorized into the strong learner category, $DL_3$ may be categorized into the average learner category, and $DL_2$ may be categorized into the weak learner category. It may also be noted that the competitiveness score of $DL_1$ may be higher as compared to $DL_3$ and the competitiveness score of $DL_3$ may be higher than the competitiveness score of $DL_2$.

Further, the set of second parameters for $DL_2$ may be trained based on the set of second parameters $DL_3$. Similarly, the set of second parameters for $DL_3$ may be trained based on the set of second parameters $DL_1$. It may be noted that, in general, a set of parameters for a predictive model belonging to the weak learner category in a given training cycle may be trained based on a set of parameters for a predictive model belonging to the average learner category in a previous training cycle.

Further, the rank or the competitiveness score may be assigned to each of the three predictive models in each of the three clusters based on the one or more performance thresholds. It may be noted that $DL_1$ may be ranked 1, $DL_3$ may be ranked 2, and $DL_1$ may be ranked 3. Further, the competitiveness score of each of $DL_1$, $DL_3$, and $DL_2$ may be 1, 2, and 3, respectively. Similarly, a cluster rank and a cluster competitiveness score may be assigned to each of the three clusters based on the performance metrics of the set of predictive models in each of the three clusters. Further, each of the three predictive models and each of the three clusters may be assigned the rank upon completion of each of the plurality of training cycles. In some embodiments, the rank may be assigned upon completion of each of the plurality of decision steps ($T_s$). It may be noted that the $T_s$ may be determined based on a type and a purpose of each of the three predictive models in the ensemble model.

Further, the performance metrics and the competitiveness score may be evaluated for each of the three predictive models in order to remove the predictive model belonging to the weak learner category from the ensemble model, when an average rank of the predictive model over a rank threshold time may be less than or equal to a weak threshold rank, upon completion of a threshold number of decision steps. On the contrary, the predictive model belonging to the average learner category or the strong learner category may be categorized in the weak learner category or the average learner category, respectively, when the average rank may be less than an average threshold rank or the strong threshold rank, respectively, over the rank threshold time. Further, the reward may be assigned to each of the three predictive models based on the rank and the associated category. It may be noted that the reward may be highest for the strong learner category and lowest for the weak learner category. Further, a state of each the three clusters may be stored as a learning of CRL. It may be noted that the state may include the reward, the rank, the competitiveness score, the performance metrics, the plurality of decision steps ($T_s$), and the cluster ID. It may also be noted that the state may be used to decide a next action by the CRL during training. Further, the generating and allocating unit 203 may send the set of predictive models and the plurality of clusters, the rank and the competitiveness score to the reinforcement learning unit 204.

Further, at step 407, the reinforcement learning unit 204 may determine loss of models and modify the previous weights based on the set of parameters and the performance metrics. By way of an example, the rewards may be "r", "r/2", and 0, corresponding to the predictive model belonging to the strong learner category, the average learner category, and the weak learner category. Further, the set of parameters for each of the set of predictive models may be obtained using a current state $C_s$. Further, the reward for each of the set of predictive models may be back-propagated to each of the set of predictive models for training by using the reward along with updated weights based on the equation (1) below.

$$v_t = \gamma v_t - 1 + \eta \nabla_\theta J(\theta) \quad (1)$$

where,
γ is the momentum,
η is the learning rate,
J(θ) is a loss function for the predictive model,
$\nabla_\theta J(\theta)$ is a gradient of the loss function w.r.t the set of parameters θ, and
θ resents the set of parameters.

Further, while rewarding, the equation (1) is modified as per equation (2) below:

$$v_t = (\gamma + R) v_t - 1 + \eta \nabla_{7+} J(\theta) \quad (2)$$

where,
R is a parameter based on the reward assigned to the predictive model. In some embodiments, R may be equal to 0.001r. It may be noted that R may boost the momentum of the predictive model based on the rank, the competitiveness score, or the performance metrics of the predictive model.

Further, the set of parameters of the predictive model belonging to the weak learner category may be updated based on the set of parameters of the predictive model belonging to the average learner category. It may be noted that the set of parameters may include the learning rate, an optimizer used, the momentum, the batch size, and a type of gradient decent. It may also be noted that the predictive model belonging to the strong learner category may take advantage of the set of parameters, the set of parameters for the predictive model belonging to the average learner category may be determined based on the set of parameters of a previous training cycle of the predictive model belonging to the strong learner category. Similarly, the predictive model belonging to the weak learner category from the predictive model belonging to the average learner category. Further, a state vector for the predictive model, representing the state of the predictive model, may be stored as a part of the CRL. It may be noted that the state vector may include the current score, the reward, and the set of parameters of the predictive model.

By way of an example, the following may be a pseudo code for a rewards and competitiveness handler in the reinforcement learning unit 204:

For each of the plurality of clusters do For each of the plurality of decision steps ($T_s$) do
Get the rank or competitiveness score for each of the set of predictive models and the associated category
    Assign the reward to each of the set of predictive models based on the associated category and the rank
        Strong learner category=reward 'r'
        Average learner category=reward 'r/2'
        Weak learner category=0 (penalize)
    Get the set of parameters (€, λ, η) of the associated category from the current state ($C_s$).

Based on the associated category of the predictive model, the reward is back-propagated as updated weights as per equation (1) and (3) given below:

$$v_t = \gamma v_t - 1 + \eta \nabla_{7+} J(\theta) \quad (1)$$

$$\theta = \theta - v_t \quad (3)$$

where,
γ is the momentum,
η is the learning rate,
J(θ) is the loss function for the predictive model,
$\nabla_\theta J(\theta)$ is the gradient of the loss function w.r.t the set of parameters θ, and
θ resents the set of parameters.

Further, based on the reward, the equation (1) is modified as per equation (2) below:

$$v_t = (\gamma + R) v_t - 1 + \eta \nabla \theta J(\theta) \quad (2)$$

where,
R is the parameter based on the reward obtained by the predictive model by the CRL, (generally, R may be equal to 0.001r).

The set of parameters of the predictive model belonging to the weak learner category is updated based on the set of parameters of the previous training cycle for the predictive model belonging to the average learner category. The set of parameters may include the learning rate, the optimizer used, €, λ, the batch size, and the type of gradient decent. The predictive model belonging to the strong learner category may learn to take advantage of self-parameters, the set of parameters for the predictive model belonging to the average learner category may be determined based on the set of parameters of the previous training cycle for the predictive model belonging to the strong learner category and similarly, the predictive model belonging to the weak learner category from the predictive model belonging to the average learner category.

Store the state vector with the current score, the reward and the set of parameters for the predictive model for the CRL.

Further, at step 408, the ensemble of models selecting unit 205 may check performance metrics of each of the set of predictive models in each of the plurality of clusters and each of the plurality of clusters. It may be noted that the performance metrics may include an accuracy score of the ensemble model. It may also be noted that the ensemble of models selecting unit 205 may evaluate the accuracy score of each of the set of predictive models belonging to the strong learner category compared to required performance metrics. In some embodiments, performance of the ensemble model at each time stamp may be measured. Further, the ensemble model of the cluster meeting the required performance metrics may be selected as the ensemble of models with best performance. Further, the method may be terminated. It may be noted that the method may be repeated when the ensemble model with the required performance metrics is not obtained. In some embodiments, at each time stamp, performance metrics of each of the plurality of clusters may be stored. Further, or each of the plurality of clusters, the ensemble of models selecting unit 205 may compare the performance metrics of the ensemble model at a time stamp with the performance metrics of the ensemble model at a previous time stamp. In some embodiments, the performance metrics of the time stamp may be stored when the performance metrics of the ensemble model at the time stamp are better than the performance metrics of the ensemble model at the previous time stamp. In such embodiments, the performance metrics of the previous time stamp may be retained when the performance metrics of the ensemble model at the previous time stamp are better than the performance metrics of the ensemble model at the time stamp. It may be noted that at any point of time, the ensemble of models selecting unit 205 may store the performance metrics of the ensemble model corresponding to best performance in each of the plurality of clusters from an initial time stamp to a current time stamp.

It may be noted that the method may not terminate when the ensemble model reaches best performance in less than a threshold performance time and may continue till the threshold performance time is elapsed. As will be appreciated, the ensemble model may be given a sufficient time to further improve through the threshold performance time. It may be noted that sometimes due to a random selection of the set of parameters, the set of predictive models may reach a local minima and meet the required performance metrics. As will be appreciated, the local minima may not be the best performance of the ensemble model. It may be noted that continuous learning may happen until the threshold performance time for sparsity in selecting the set of parameters, the set of predictive models may move out of the local minima, converge on global minima and meet the required performance metrics.

By way of an example, John may take his autonomous car for a test drive. To his surprise, he may find that the autonomous car does not stop when the traffic signal changes to red. A careful analysis from the vendor may show that the scene classifier in the autonomous car has not learnt to identify red signal. A different classifier may then be used. However, the car may then fail to start when the signal changes from red to green. This time, the vendor may use the system and method based on the CRL to make the classifier learn all the required features.

Referring now to FIGS. 5A and 5B, an exemplary table 500 describing the set of parameters for the set of predictive models, a set of threshold parameters, and rank and competitiveness score parameters, along with initialization values, in accordance with some embodiments of the present disclosure. The table 500 includes a name 501 and a corresponding description 502 for each of the set of parameters for the set of predictive models, a set of threshold parameters, and rank and competitiveness score parameters. The set of parameters for the set of predictive models may include a set of hyper-parameters 503, and a total number of epochs ($T_e$) 504, The set of threshold parameters may include a competitive threshold ($C_t$) 505, a threshold rank 506, a threshold performance score 507, a rank threshold time 508, and a weak threshold time 509. The rank and competitiveness score parameters may include a reward 510 and a percentile rank 511. Other parameters described in the exemplary table 500 are a timestamp 512, a state 513, and a total time 514.

The set of hyper-parameters 503 may include the momentum ($\gamma$) and the learning rate ($\eta$). The set of hyper-parameters 503 of each of the set of predictive models in each of the plurality of clusters may be determined based on a decision made at each $T_s$ 512. The $T_e$ 504 may be the plurality of training cycles after which the system may stop executing. The $C_t$ 505 may be a threshold to remove the predictive model from the ensemble model. It may be noted that the $C_t$ 505 may be initialized to 0. The threshold rank 506 may be a minimum threshold rank averaged over a predefined number of decision steps for the predictive model to achieve in order to be retained in the ensemble model. In some embodiments, the threshold rank 506 may also be applied to the plurality of clusters. The threshold performance score 507 may be used to decide the associated category of the predictive model based on its performance. In some embodiments, the threshold performance score 507 may also be applied for the plurality of clusters. It may be noted that the threshold performance score 507 may be predefined for each of the strong learner category, the average learner category, and the weak learner category as the strong performance threshold score, the average learner threshold score, and the weak learner threshold score, respectively.

The rank threshold time 508 may be a finite number of $T_s$ 512 to evaluate each of the set of predictive models and assign the rank. In some embodiments, the rank threshold time 508 may also be applied to each of the plurality of clusters. The weak threshold rank 509 may be a threshold rank for removing the predictive model belonging to the weak learner category from the ensemble model based on the performance metrics. For example, the predictive model may be removed from the ensemble model when the competitiveness score or the rank of the predictive model may average below the weak threshold rank 509 over a period of the rank threshold time 508. The reward 510 may correspond to the reward in deep reinforcement learning or the CRL. It may be noted that the reward 510 is a numerical value and may be initialized to 0. The percentile rank 511 may be a percentile among the set of predictive models based on the performance metrics. In some embodiments, it may also be applied to the plurality of clusters.

The $T_s$ 512 may be a duration of time in minutes used as a decision time stamp. It may be noted that at each $T_s$ 512, a decision for next step is taken. In some embodiments, the $T_s$ 512 may be initialized to 0. The state 513 may be a list with a snapshot of cluster information, current value of each of the set of hyper-parameters 503, the reward 510, and competitiveness parameters. In some embodiments, the state 513 may store the list for each of the plurality of clusters. Further, initially, the state 513 may store the list with initialized values of each of the cluster information, current value of each of the set of hyper-parameters 503, the reward 510, and competitiveness parameters. The total time 514 may be a time taken to end the execution.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
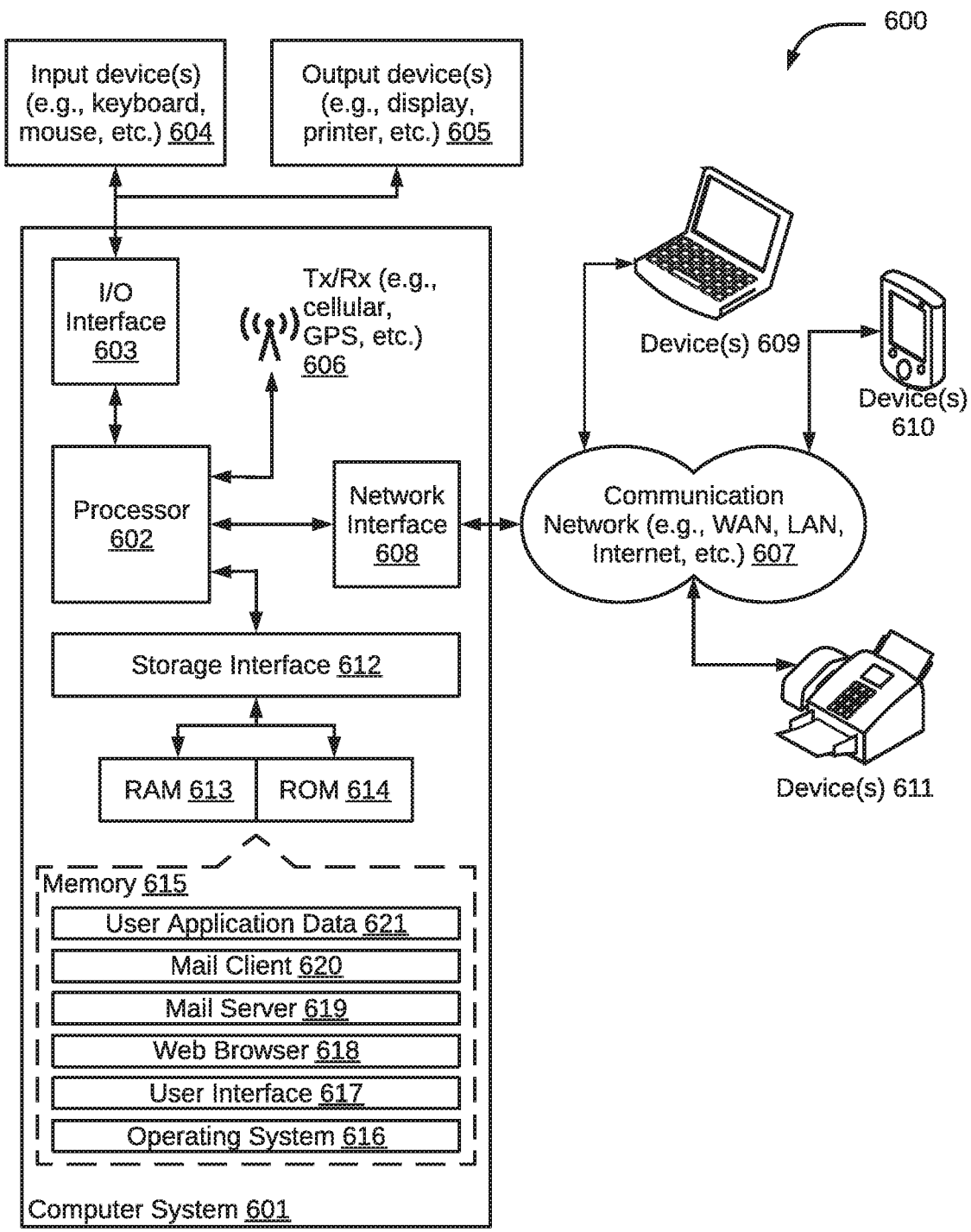
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for building an ensemble model. Computer system 601 may include a central processing unit ("CPU" or "processor") 602, Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g.; the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure, Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of inefficient building of ensemble model and/or inefficient determination of optimized hyper-parameters for the ensemble model. The method and system provide for a robust and efficient mechanism for building ensemble models using CRL and for further ensuring an efficient and faster selection of the hyper-parameters. The disclosed method and system create the plurality of clusters, each including a set of predictive models forming the ensemble model. Each of the set of predictive models may be assigned the set of parameters, allowing a plurality of combinations to be processed in parallel. Further, the method and system categorize each of the set of predictive models into a first associated category (the strong learner category, the average learner category, or the weak learner category) based on the first accuracy score. The predictive model in the weak learner category may determine the set of parameters for next epoch based on the set of parameters of the predictive model in the average learner category. Further, the predictive model in the strong learner category may be assigned highest reward and the predictive model in the weak learner category may be assigned lowest reward. It may be noted that the method and system increase competitiveness among the set of predictive models, thereby reducing the total number of epochs and iterations.

Specifically, the claimed limitations of the present disclosure address the technical challenge by creating a plurality of clusters, each including a set of predictive models forming the ensemble model, and for each of the plurality of clusters, initializing each of the set of predictive models with random values for a set of first parameters to obtain a first accuracy score, categorizing each of the set of predictive models into a first associated category based on the first accuracy score, calculating a first reward for each of the set of predictive models based on the first associated category, and determining a set of second parameters for each of the set of predictive models using CRL to obtain a second accuracy score.

As will be appreciated by those skilled in the art, the techniques described in the various embodiments discussed above are not routine, or conventional, or well understood in the art. The techniques discussed above provide for building an ensemble model and for improving performance of the ensemble model by employing CRL. The techniques first create a plurality of clusters, each including the set of predictive models forming the ensemble model. The techniques may then employ CRL to select better performing predictive models from among the set of predictive models in each cluster and a better performing cluster from among the set of clusters and, therefore, help in building and improving the efficiency of the ensemble model. Further, the poor performing predictive models may be removed from the ensemble model, thereby leading to an optimized ensemble model. Further, techniques described in the various embodiments discussed above provide for processing each of the plurality of clusters in parallel in a single epoch, thereby reducing the total number of epochs and thus providing an efficient and faster method for building the ensemble model and for selecting the hyper-parameters of the ensemble model.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for building an ensemble model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein, Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for building an ensemble model, the method comprising:
    creating, by an ensemble model building device, a plurality of clusters, each comprising a set of predictive models forming the ensemble model; and
    for each of the plurality of clusters,
        initializing, by the ensemble model building device, each of the set of predictive models with random values for a set of first parameters to obtain a first accuracy score;
        categorizing, by the ensemble model building device, each of the set of predictive models into a first associated category based on the first accuracy score, wherein the first associated category comprises one of a strong learner category, an average learner category, and a weak learner category;
        calculating, by the ensemble model building device, a first reward for each of the set of predictive models based on the first associated category, wherein the first reward is highest for the strong learner category and lowest for the weak learner category;
        determining, by the ensemble model building device, a set of second parameters for each of the set of predictive models using competitive reinforcement learning (CRL) to obtain a second accuracy score;
        determining a second associated category for each of the set of predictive models based on the second accuracy score, wherein the second associated category comprises one of a strong learner category, an average learner category, and a weak learner category;
        calculating a second reward for each of the set of predictive models based on the second associated category, wherein the second reward is highest for the strong learner category and lowest for the weak learner category; and
        selecting a set of output predictive models, wherein the set of output predictive models comprises each of the set of predictive models belonging to the strong learner category based on a predefined threshold time.

2. The method of claim 1, further comprising, for each of the plurality of clusters, removing a predictive model from among the set of predictive models belonging to the weak learner category based on a predefined threshold time.

3. The method of claim 1, wherein determining the set of second parameters for each of the set of predictive models further comprises one of:
    determining the set of second parameters for a predictive model belonging to the weak category based on the set of first parameters of an identical predictive model belonging to the average category; or
    determining the set of second parameters for a predictive model belonging to the average category based on the set of first parameters of an identical predictive model belonging to the strong category.

4. The method of claim 1, further comprising assigning a rank and a competitiveness score to each of the set of predictive models in each of the plurality of clusters and to each of the plurality of clusters based on the second accuracy score, and a difference between the first accuracy score and the second accuracy score.

5. The method of claim 1, further comprising determining, for each of the set of predictive models, updated weights by modifying previous weights based on the set of first parameters and the first reward.

6. The method of claim 1, wherein the set of first parameters and the set of second parameters comprise a batch size, a learning rate, a momentum, a number of epochs, and one or more performance thresholds.

7. A system for building an ensemble model, the system comprising:
    a processor; and
    a computer-readable medium communicatively coupled to the processor, wherein the computer-readable medium stores processor-executable instructions, which when executed by the processor, cause the processor to:
        create a plurality of clusters, each comprising a set of predictive models forming the ensemble model; and
        for each of the plurality of clusters,
            initialize each of the set of predictive models with random values for a set of first parameters to obtain a first accuracy score;

categorize each of the set of predictive models into a first associated category based on the first accuracy score, wherein the first associated category comprises one of a strong learner category, an average learner category, and a weak learner category;

calculate a first reward for each of the set of predictive models based on the first associated category, wherein the first reward is highest for the strong learner category and lowest for the weak learner category;

determine a set of second parameters for each of the set of predictive models using competitive reinforcement learning (CRL) to obtain a second accuracy score;

determine a second associated category for each of the set of predictive models based on the second accuracy score, wherein the second associated category comprises one of a strong learner category, an average learner category, and a weak learner category;

calculate a second reward for each of the set of predictive models based on the second associated category, wherein the second reward is highest for the strong learner category and lowest for the weak learner category; and select a set of output predictive models, wherein the set of output predictive models comprises each of the set of predictive models belonging to the strong learner category based on a predefined threshold time.

8. The system of claim 7, wherein, for each of the plurality of clusters, the processor-executable instructions, on execution, further cause the processor to remove a predictive model from among the set of predictive models belonging to the weak learner category based on a predefined threshold time.

9. The system of claim 7, wherein determining the set of second parameters for each of the set of predictive models further comprises one of:
  determining the set of second parameters for a predictive model belonging to the weak category based on the set of first parameters of an identical predictive model belonging to the average category; or
  determining the set of second parameters for a predictive model belonging to the average category based on the set of first parameters of an identical predictive model belonging to the strong category.

10. The system of claim 7, wherein the processor-executable instructions, on execution, further cause the processor to assign a rank and a competitiveness score to each of the set of predictive models in each of the plurality of clusters and to each of the plurality of clusters based on the second accuracy score, and a difference between the first accuracy score and the second accuracy score.

11. The system of claim 7, wherein the processor-executable instructions, on execution, further cause the processor to determine, for each of the set of predictive models, updated weights by modifying previous weights based on the set of first parameters and the first reward.

12. A non-transitory computer-readable medium storing computer-executable instructions for building an ensemble model, the computer-executable instructions configured for:

creating a plurality of clusters, each comprising a set of predictive models forming the ensemble model; and
for each of the plurality of clusters,
  initializing each of the set of predictive models with random values for a set of first parameters to obtain a first accuracy score;
  categorizing each of the set of predictive models into a first associated category based on the first accuracy score, wherein the first associated category comprises one of a strong learner category, an average learner category, and a weak learner category;
  calculating a first reward for each of the set of predictive models based on the first associated category, wherein the first reward is highest for the strong learner category and lowest for the weak learner category; and
  determining a set of second parameters for each of the set of predictive models using competitive reinforcement learning (CRL) to obtain a second accuracy score;
  determining a second associated category for each of the set of predictive models based on the second accuracy score, wherein the second associated category comprises one of a strong learner category, an average learner category, and a weak learner category;
  calculating a second reward for each of the set of predictive models based on the second associated category, wherein the second reward is highest for the strong learner category and lowest for the weak learner category; and
  selecting a set of output predictive models, wherein the set of output predictive models comprises each of the set of predictive models belonging to the strong learner category based on a predefined threshold time.

13. The non-transitory computer-readable medium of claim 12, wherein, for each of the plurality of clusters, the computer-executable instructions are further configured for at least one of:
  removing a predictive model from among the set of predictive models belonging to the weak learner category based on a predefined threshold time.

14. The non-transitory computer-readable medium of claim 12, wherein determining the set of second parameters for each of the set of predictive models further comprises one of:
  determining the set of second parameters for a predictive model belonging to the weak category based on the set of first parameters of an identical predictive model belonging to the average category; or
  determining the set of second parameters for a predictive model belonging to the average category based on the set of first parameters of an identical predictive model belonging to the strong category.

15. The non-transitory computer-readable medium of claim 12, wherein the computer-executable instructions are further configured for assigning a rank and a competitiveness score to each of the set of predictive models in each of the plurality of clusters and to each of the plurality of clusters based on the second accuracy score, and a difference between the first accuracy score and the second accuracy score.

* * * * *